May 13, 1969   P. J. TAMMINEN   3,443,994
ELECTRODE ARRANGEMENT IN HIGH ENERGY GALVANIC BATTERIES
Filed Dec. 28, 1965   Sheet 1 of 2

INVENTOR
PENTTI JUUSE TAMMINEN
BY Albert M. Parker
ATTORNEY

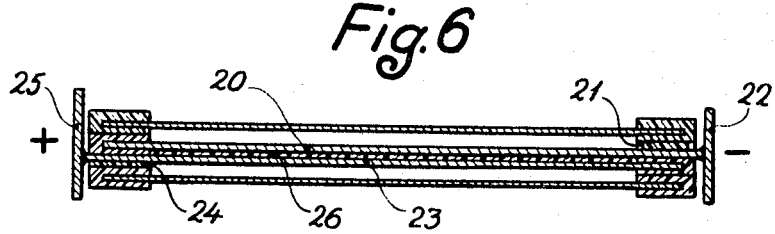
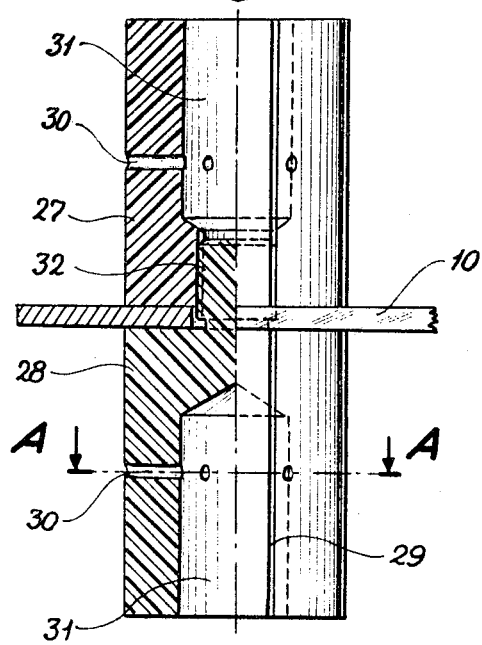
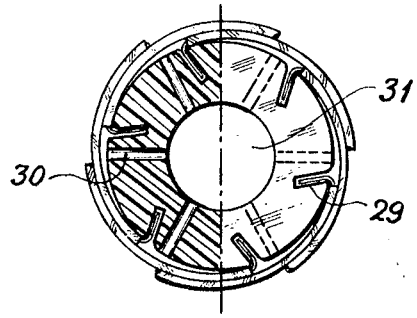

United States Patent Office
3,443,994
Patented May 13, 1969

3,443,994
ELECTRODE ARRANGEMENT IN HIGH ENERGY
GALVANIC BATTERIES
Pentti J. Tamminen, Otaniemi, Finland, assignor to Oy Airam AB, Helsinki, Finland, a corporation of Finland
Filed Dec. 28, 1965, Ser. No. 516,935
Claims priority, application Finland, Dec. 31, 1964, 2,798/64
Int. Cl. H01m 35/06
U.S. Cl. 136—69
1 Claim

ABSTRACT OF THE DISCLOSURE

An electrode arrangement for high energy galvanic batteries having large elongated duplex electrodes with U-shaped ribbons of flexible plastic fitted tightly along their longitudinal edges. A number of such electrodes are assembled in overlying relationship with one of them serving as the terminal electrode and having tapes of aluminum foil secured along the borders of that electrode and folded over the plastic bordering ribbons. The assembly, or a plurality of them axially aligned, are secured within a cylindrical metal casing and provision is made for electrolyte to be introduced through a center hollow axis and to be forced to flow outwardly through the intervening spaces between the electrodes of one assembly, then axially and back inwardly through the intervening spaces between the electrodes of the adjacent assembly.

---

Two major problems in galvanic batteries at high rate discharge of long duration are the evolution of heat inside the battery and the accumulation of reaction products in the vicinity of electrode surfaces. Both the excessive heat and passivating layers of reaction products must be removed in order to maintain the battery performance. A practical method to achieve this is to arrange in the battery means for causing a flow of the electrolyte along the electrode surfaces, which electrolyte acts as coolant and at the same time carries away the reaction products. The battery performance is usually the better, the higher is the velocity of the electrolyte flow.

Another viewpoint which must be considered when constructing an electrode system for high energy galvanic batteries is the need to have as large as possible active electrode surfaces, in order to obtain high output current. Further, the electrodes and current collectors must be shaped in a way which makes possible extremely low ohmic resistances.

The object of the present invention is to provide a compact and practical electrode arrangement suitable for high energy galvanic batteries, comprising large electrode surfaces, a possibility for a high velocity electrolyte flow along the active electrode surfaces, and a current collector design that makes small ohmic resistances possible.

Figure 1:
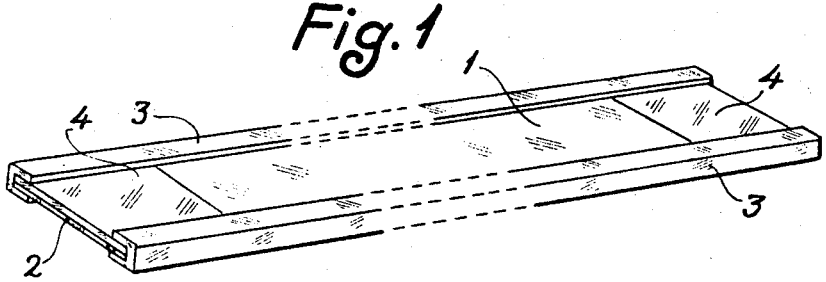
Figure 2:
Figure 3:
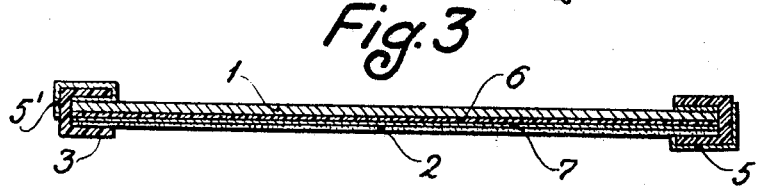
Figure 4:
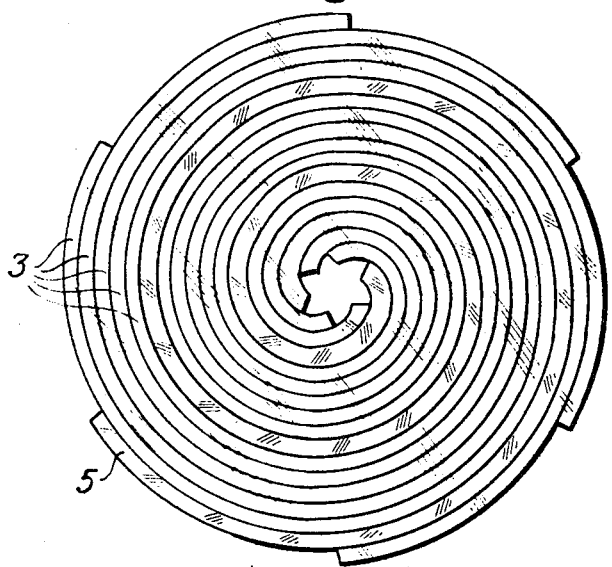
Figure 5:
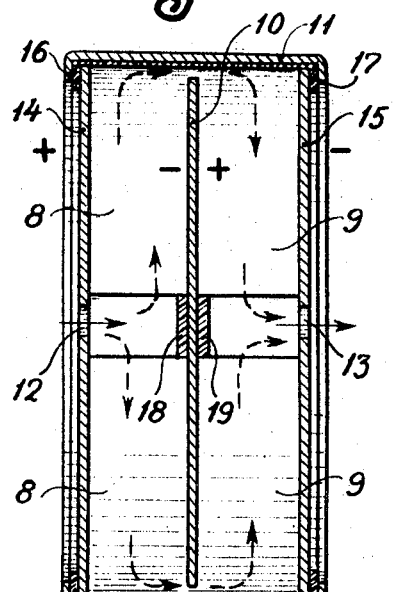

The invention is illustrated in more detail with reference to the accompanying drawing in which:

FIG. 1 is a perspective view of a duplex electrode,
FIG. 2 is a section of an electrode shown in FIG. 1,
FIG. 3 is a section of a combined positive and negative terminal electrode,
FIG. 4 shows a principal construction of the electrode unit,
FIG. 5 shows diagrammatically how two electrode units are connected in series,
FIG. 6 is a section of an electrode unit with a modified terminal arrangement,
FIG. 7 shows an assembly of the cores of two adjacent electrode units,
FIG. 8 is a section along line A—A of FIG. 7, showing how electrodes are fixed in the slots of the core.

The electrode shown in FIG. 1 and in FIG. 2 applies to a chromic acid type of batteries, in which the electrolyte comprises chromic acid and sulfuric acid, and electrodes are usually of carbon and zinc or magnesium. This electrode is made of a fairly long zinc band 1, the other side of which is coated with a layer 2 of carbon loaded plastic, e.g. polyisobutylene. The longitudinal borders of such duplex, or bipolar electrode are provided with tightly fitting U-shaped ribbons 3 of flexible plastic, such as softened polyvinyl chloride or neoprene rubber. The both ends of the electrode are coated with an insulating layer 4, e.g., by dipping them into a PVC solution.

The electric current of the battery is collected to the terminals along the longitudinal borders of a terminal electrode as shown in FIG. 3. In the longitudinal direction of the electrodes there will thus be no electric currents which, considering the ohmic resistances of thin electrode bands, would cause high losses of effect. A tape of aluminum foil 5 is fixed at the longitudinal border of the electrode and folded over the bordering ribbon 3 along the positive or right hand order as viewed in FIG. 3. A similar tape 5' is similarly folded over the negative or left hand border as viewed in FIG. 3. In the terminal electrode the cathode and the anode must be insulated from each other. Therefore a plastic foil 6 is laminated on the other side of the zinc anode 1. The cathode consists of an aluminum foil 7, on which the carbonaceous coating 2 is applied.

The electrode unit of the battery is preferably assembled as shown in FIG. 4. A number of identical electrodes according to FIG. 1 and FIG. 2 and one terminal electrode according to FIG. 3 are placed in a star-shaped rack, the other ends fixed into slots of a core in the centre. By twisting the core a compact unit of spirally bent electrodes is formed. The shadowed spiral 5 indicates the contact surface of the terminal electrode. A similar contact spiral is formed on the other side of the electrode unit.

To prevent the breaking up of the electrode assembly it is placed into a cylindrical metal casing, the inside of which may be lined with an insulating layer, such as Plexiglas. FIG. 5 shows how two electrode units according to FIG. 4 are assembled in the same container and connected in series. Between the electrode units 8 and 9 there is a thin aluminum disc 10 which effects the contact from the negative terminal of the electrode unit 8 to the positive terminal of the electrode unit 9. The diameter of the contact disc 10 is smaller than the inner diameter of the container 11. The centre of the contact disc 10 is preferably coated with insulating layers 18 and 19. The electrode units 8 and 9 are pressed tightly together by rigid aluminium plates 14 and 15, which also act as terminals of the battery. The pressure is maintained by folding the edges of container 11 inwards. Gaskets 16 and 17 prevent short circuit and electrolyte leakage.

The electrolyte is forced into the battery unit shown in FIG. 5 through the centre hole 12, and it flows through the intervening spaces of the electrodes of the electrode unit 8, further horizontally to the periphery of the electrode unit 9, through the intervening spaces of the electrodes of the electrode unit 9, and out from the battery unit through the centre hole 13. In FIG. 5 the electrolyte flow is marked by arrows.

Any number of electrode units, electrically in series or in parallel, may be connected this way in series with respect to the electrolyte flow. This way, before the electrolyte is discarded at the outlet, its active ingredients can be utilized to the utmost. In order to compensate the reduced reactivity of the electrolyte it is preferable to gradually reduce the number of the electrodes in the electrode units towards the outlet end. Because the diameter of the container keeps constant, the length and thus the active surface of each remaining electrode can be increased correspondingly. This way the maximum current output of the battery can be maintained.

FIG. 7 shows an assembly of two cores, 27, and 28, of adjacent electrode units, and FIG. 8 a section along line A—A of FIG. 7. FIG. 8 also shows how the ends of the electrodes principally according to FIG. 1 are bent and fitted to slots 29 of the core. Between each two of the slots 29 there is drilled a hole 30 to the centre duct 31. In order to secure uniform distribution of the electrolyte to the cells, the diameter of each of the holes 30 is the same and relatively small. The cores 27 and 28 which are preferably made of plastic, such as polythene, are fixed together by a screw joint at 32, contact disc 10 being pressed between the cores.

If the heat capacity of the electrolyte is not sufficient for cooling of the battery at high discharge rates, a water cooled aluminium pipe may be installed in the centre duct. The cooling may also be brought about by rinsing the metal container by water.

This construction is applicable to a variety if other battery systems as well, and also to fuel cells. In this case, e.g., the oxygen atmosphere is arranged against the other flat side of the electrode unit, and the bordering ribbons of the electrodes are provided with small holes through which the gas can penetrate the porous electrodes. The fuel, correspondingly, may be arranged on the other flat side of the electrode unit, and paths for it are provided through the bordering ribbons to the anodes.

I claim:
1. Electrode system for high energy galvanic batteries having an electrolyte flowing through the battery, comprising at least two electrode units within a common container, each electrode unit being substantially cylindrical, having a central, axial opening, and comprising a plurality of adjacent bipolar plate electrode members, each of said members extending along a spiral-shaped path from said central opening to the periphery of said electrode unit, insulating members extending along the edges of and between said electrode members to form channels for the flow of electrolyte between each pair of adjacent electrode members, at least one of said electrode members forming a terminal electrode assembly and including a pair of terminal electrodes separated by an insulating layer current collectors extending along and engaged with one of the longitudinal edges of each of the terminal electrodes of the terminal electrode assembly, said electrode units being arranged axially one upon the other having a contact plate between two adjacent electrode units and a path for the flow of electrolyte in series through said electrode units.

References Cited

UNITED STATES PATENTS

| 3,148,090 | 9/1964 | Saslow | 136—90 |
| 3,156,586 | 11/1964 | Solomon et al. | 136—100 |
| 3,178,316 | 4/1965 | Wilke | 136—90 |
| 3,298,871 | 1/1967 | Binder et al. | 136—13 |
| 3,304,203 | 2/1967 | Nordvik | 136—6 |

WINSTON A. DOUGLAS, *Primary Examiner.*

A. SKAPARS, *Assistant Examiner.*

U.S. Cl. X.R.

136—10, 13, 83